H. J. TOMPKINS.
DEVICE FOR PLANTING SEEDLINGS.
APPLICATION FILED MAR. 11, 1912.
1,026,331.
Patented May 14, 1912.
Fig. 2.
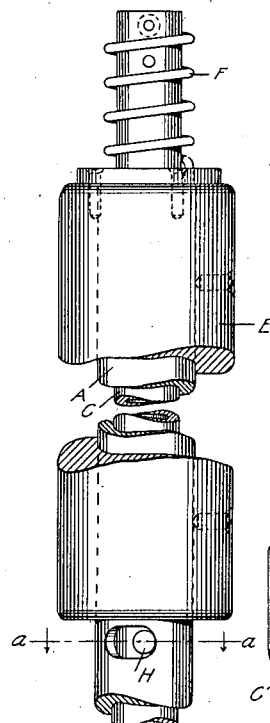
Fig. 3.
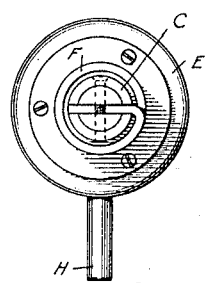
Fig. 4.
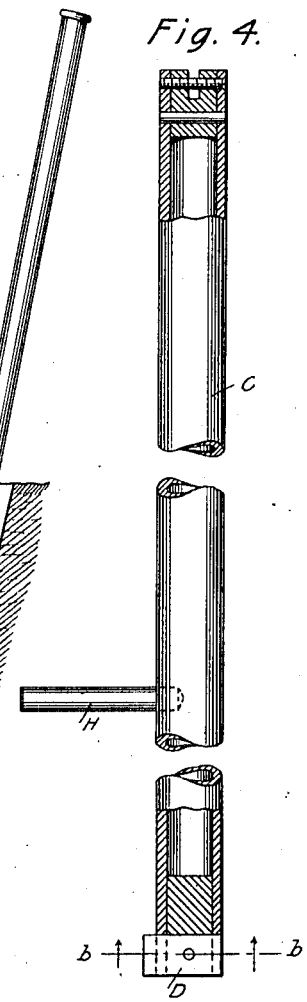
Fig. 1.
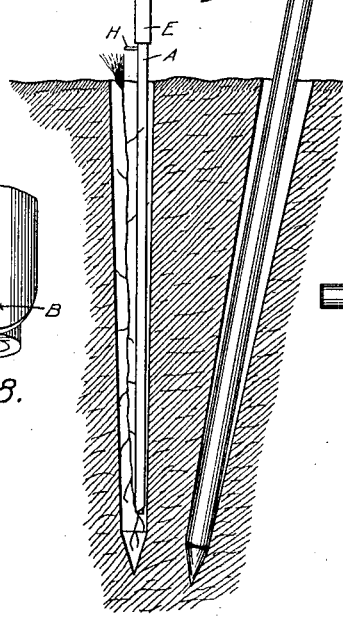
Fig. 8.
Fig. 5.
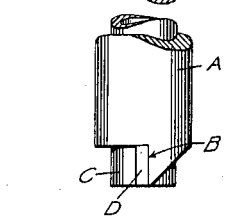
Fig. 6.
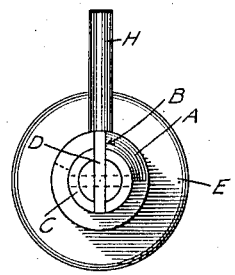
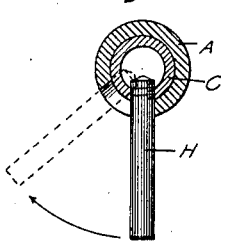
Fig. 7.
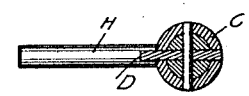
Witnesses
Floyd R. Harrison
Charles W. Boyle
Inventor
Harry James Tompkins
BY
Attorney
COLUMBIA PLANOGRAPH CO., WASHINGTON, D. C.

UNITED STATES PATENT OFFICE.

HARRY JAMES TOMPKINS, OF BERKELEY, CALIFORNIA.

DEVICE FOR PLANTING SEEDLINGS.

1,026,331.  Specification of Letters Patent.  Patented May 14, 1912.

Application filed March 11, 1912. Serial No. 683,159.

(DEDICATED TO THE PUBLIC.)

*To all whom it may concern:*

Be it known that I, HARRY JAMES TOMPKINS, an employee of the Department of Agriculture of the United States of America, residing at Berkeley, county of Alameda, State of California, (whose post-office address is Berkeley, California,) have invented a new and useful Device for Planting Seedlings.

This application is made under act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to a device or implement for planting seedlings.

The object of my invention is to provide a device for facilitating and making more successful and economical the planting on a commercial scale of seedlings, particularly the species of trees native to the Sierra Mountains, such as the *Pinus ponderosa, Pinus Lambertiana, Abies concolor, Libocedrus decurrens, Quercus Californica,* and other species. The trees of this region develop a seedling root system radically different from that of species native to either Europe or the eastern part of the United States where the customary method of planting tree seedlings obtains due to the long annual summer drought characteristic of the California climate. The difference consists in the development of a tap root from three to five times the length of the roots of similar species of Europe and the eastern United States. Furthermore, the Sierra species in the first two years of growth develop only a few short and weak lateral roots, while similar species of Europe and the eastern United States produce strong bushy or forked roots.

It is the purpose of my invention to provide a device simple and inexpensive in construction, and easy of operation, which is not only specially adapted for planting seedlings of the Sierra species of trees, but can also be satisfactorily employed for planting seedlings of other species.

The nature and scope of my invention will be readily understood by the following description taken in connection with the accompanying drawings, wherein, Figure 1 is a view showing the planting device in operation; Fig. 2 is an elevation, intermediate lengths broken away; Fig. 3 is a top plan view; Fig. 4 is an elevation of the inner tube, the ends in section, and intermediate parts broken away; Fig. 5 is a bottom plan view; Fig. 6 is a section through "*a—a*," of Fig. 2; Fig. 7 is a section through "*b—b*," of Fig. 4; and Fig. 8 is a perspective view of the lower end of the device.

Referring to the drawings, A represents the exterior or outer tube of my device which is cut away three-fourths of its circumference, leaving a flat radial face, B, parallel to the axis of said tube, having a width equal to the wall of tube A.

C designates an inner tube. This tube is arranged within tube A. The inner tube, C, is provided with a lug, D, rigidly secured thereto by rivets or other suitable mode of adjustment. To the tube, A, I attach a handle, E. This handle is adjusted to said tube, A, at its upper end by means of set screws.

F represents a pressure spring. The top of said spring is radially bent and inserted in a slot arranged in the upper end of the tube, C, where it is rigidly held by a screw or other suitable device. The other end of spring, F, is immovably attached to handle, E, by screws or other means. Said spring, F, which is attached in tension, rotates the tube, C, in the tube, A, and this action holds the lug, D, against the face, B, and the spring, F, also by longitudinal pressure keeps the surface of the lug, D, against the surface of the tube, A. In order to turn the lug, D, back from the face, B, I provide a pin, H, which is detachably affixed to the inner tube, C, and projects through the oblong hole in the tube, A, and the action of the backward movement of the lug, D, is accomplished by the operator pressing his finger or thumb on the pin H. Such pressure partly rotates the tube, C, and this turns the lug, D, back from the face B.

My device may be made of brass, steel, or other suitable material.

In practising my invention I make a planting hole for the seedlings with a ⅞ inch octagonal steel bar about five feet long and pointed at one end. The season of the planting must be chosen when the ground is thoroughly moist to the depth to which the roots are to be placed. This, of course, will vary with the season and altitude. The hole is drilled to the required depth. I then take my device, when the parts hereinbefore described have been properly arranged for manipulation, and press the pin, H, thereby rotating the tube, C, against the pressure of the spring F. This separates the lug, D, and the face, B, and the tip of the root is placed between them. The pin, H, is then released, allowing the spring, F, by rotary pressure to turn the tube, C, in the tube, A, and thus cause the lug, D, to approach the face, B, thereby holding the tip of the root. When the root is so held the device is put in the planting hole and gradually lowered until the root is safely placed therein. After which operation, I press the pin, H, thereby turning the lug, D, back from the face, B, and releasing the seedling root in the planting hole. The device is then withdrawn, and the hole containing the root is then closed in any convenient way.

Having thus described my invention, I claim:

1. A planting device, consisting of an inner and an outer tube, said inner tube provided with a lug at one end, said outer tube having a radial face, B, a handle secured to said outer tube, a spring having a radially bent end secured in the upper portion of said inner tube, said spring responding to pressure and rotating said inner tube, thereby forcing said lug against the face, B, for holding seedling roots, substantially as specified.

2. A planting device consisting of an inner and outer tube, said inner tube provided with a lug at one end, said outer tube having a radial face, B, a handle secured to said outer tube, a spring attached at the lower end to the outer tube and at the upper end to the inner tube, said spring being attached in tension and when released from pressure rotating said inner tube thereby throwing said lug in contact with the face, B, a pin projecting through the upper portion of said outer tube and detachably connected with said inner tube, said pin adapted to release said lug from contact with the face, B, in response to pressure, substantially as specified.

In testimony whereof, I affix my signature in the presence of two subscribed witnesses.

HARRY JAMES TOMPKINS.

Witnesses:
R. L. EGENHOFF,
W. L. HUBER.

---

Copies of this patent may be obtained for five cents each, by addressing the "Commissioner of Patents, Washington, D. C."